Figure 1:
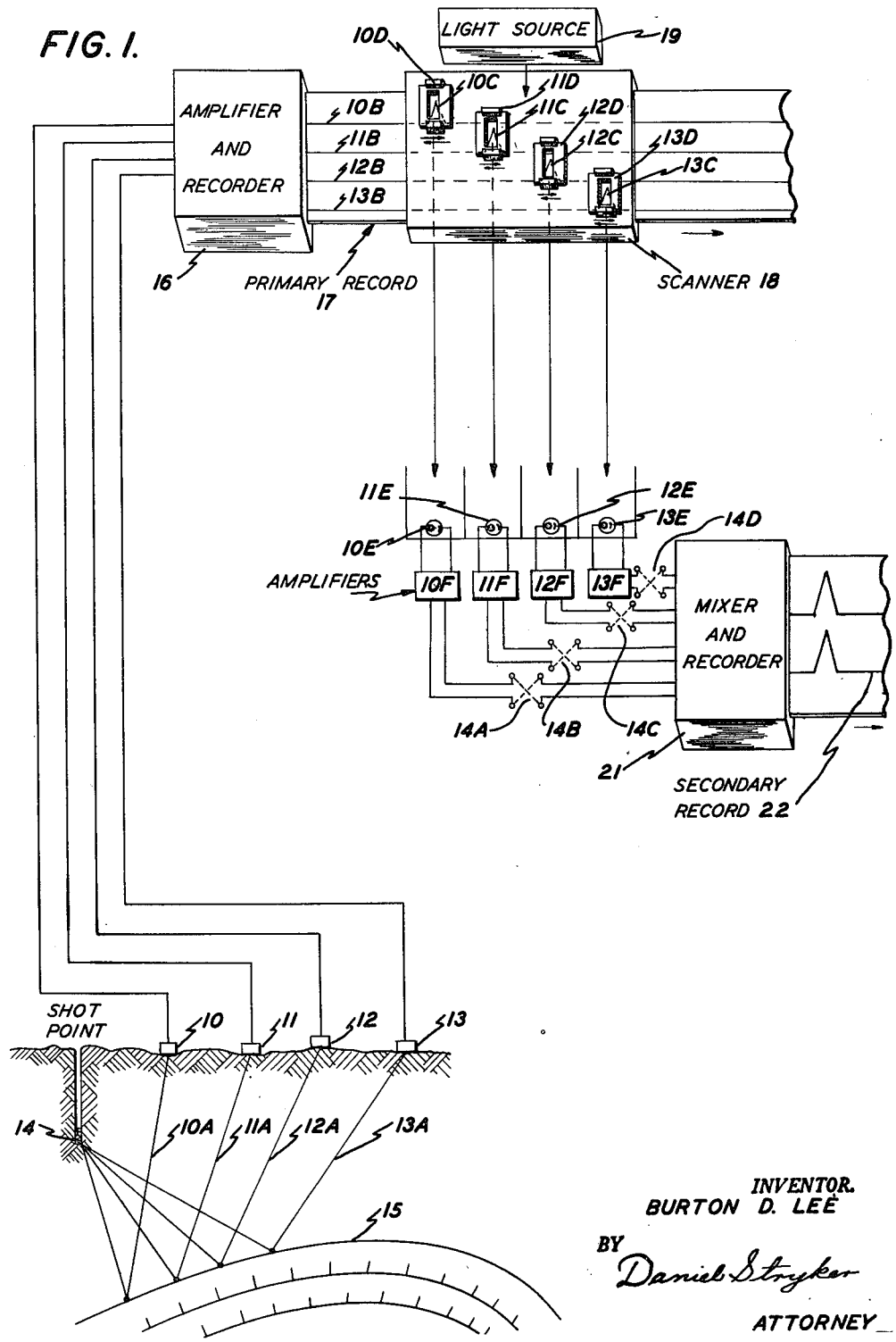

May 12, 1953 B. D. LEE 2,638,402
SEISMIC PROSPECTING
Filed June 9, 1947 2 Sheets-Sheet 1

INVENTOR.
BURTON D. LEE
BY Daniel Stryker
ATTORNEY

May 12, 1953   B. D. LEE   2,638,402
SEISMIC PROSPECTING
Filed June 9, 1947   2 Sheets-Sheet 2
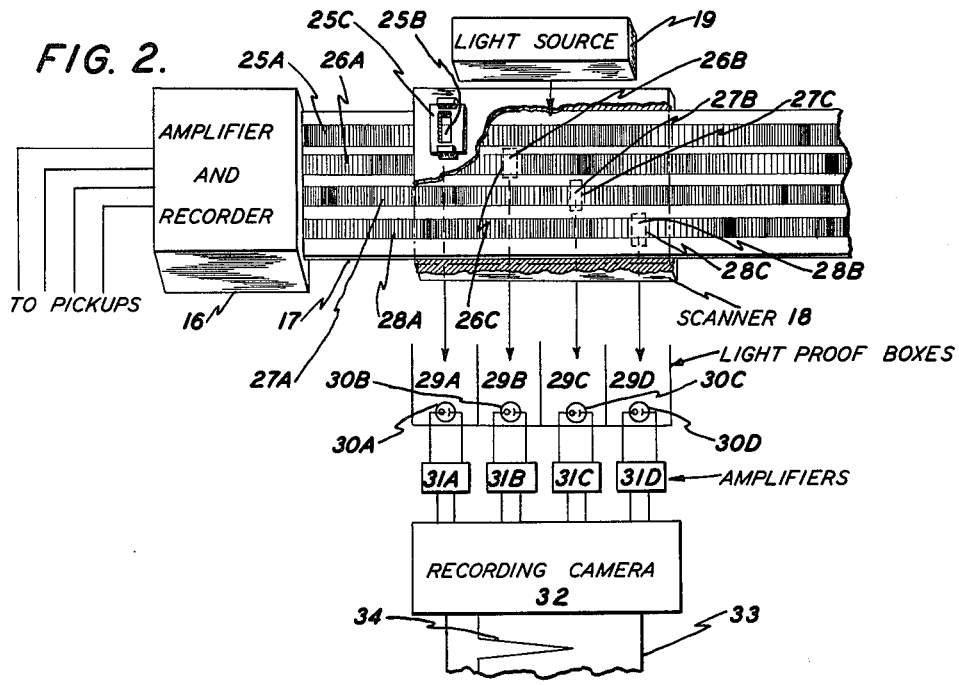
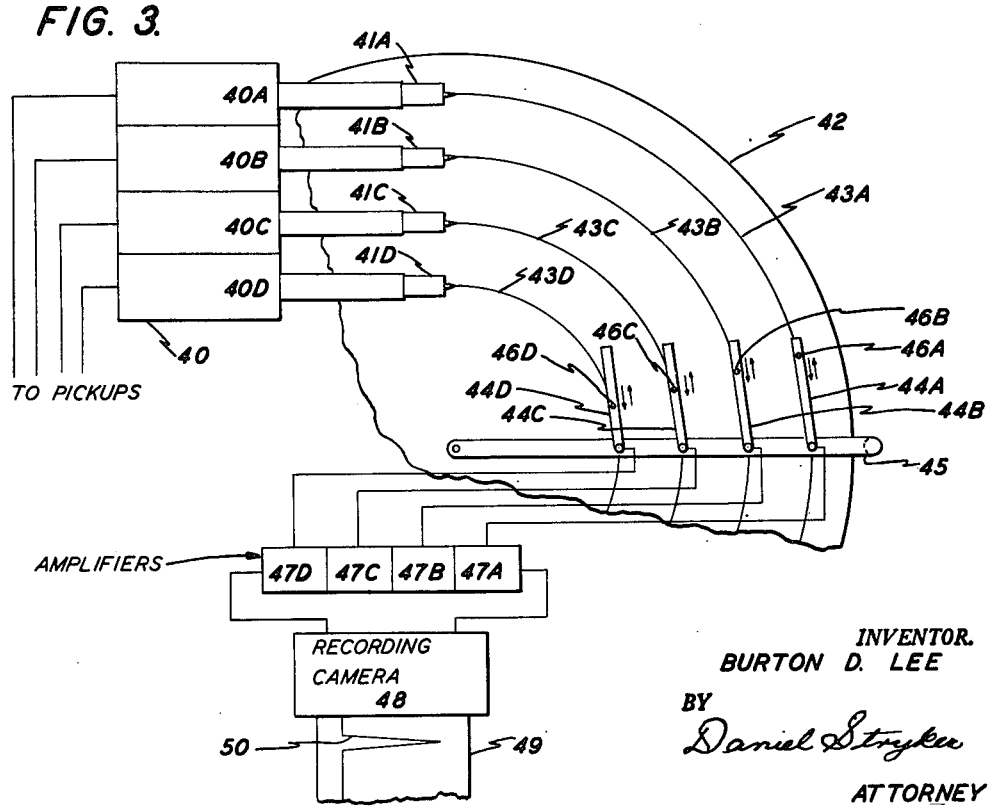
INVENTOR.
BURTON D. LEE
BY
Daniel Stryker
ATTORNEY Patented May 12, 1953

2,638,402

UNITED STATES PATENT OFFICE 2,638,402

SEISMIC PROSPECTING

Burton D. Lee, Houston, Tex., assignor to The Texas Company, New York, N. Y., a corporation of Delaware Application June 9, 1947, Serial No. 753,541

2 Claims. (Cl. 346—33)

This invention is concerned with seismic prospecting and especially with reflection seismograph practice. It provides improvements to the end that records from a plurality of seismometers may be physically mixed for interpretation purposes with more accurate compensation of phase-time factors between traces.

In seismic prospecting, an explosive charge is fired at a shot point, and the resulting seismic or acoustic waves are picked up (usually after reflection from a formation interface in which marked change in the velocity of the wave occurs) by a plurality of seismometers spaced from each other in the neighborhood of the shot point in any one of a number of patterns. Each seismometer is connected through an amplifier to a recording means, and the response of each seismometer usually is indicated as a separate trace on a moving film in a camera by means of a galvanometer or the like, the net result being a graph of vibration amplitude against time.

To aid in interpretation of the graph or seismogram thus produced, it has been common, especially in reflection seismograph practice, to add the output of two or more individual seismometers either before or after amplification, the resulting sum being recorded as a single trace on the seismogram.

As indicated above, the seismometers or pickups may be spread on the area being explored in various patterns. In a common pattern, the pickups are spaced from each other in a straight line extending outwardly from the shot point and numbered consecutively away from the shot point. In such an arrangement, the outputs of the first and second pickups may be added to produce a first trace; the outputs of the second and third pickups to produce a second trace; the outputs of the third and fourth pickups to produce a third trace and so on. Similarly the outputs of the first three pickups may be added to produce one trace; the outputs of the second, third and fourth pickups may be added to produce another trace, and so forth. Still another possible arrangement is to add one half the amplitude of the output of the first pickup, the full amplitude of the output of the second pickup and one half the amplitude of the third pickup to produce a first trace, and so on, each trace being composed of the sum of the full amplitude of the output of a certain pickup plus half the amplitude of the outputs of the two immediately adjacent pickups. There are many other possible arrangements by which the outputs of the individual pickups or groups of pickups may be mixed, but all have the same objective, namely to produce a record on which recognition of the reflected waves is facilitated. The arrangements work well in cases where the time-phase differences between the outputs of the pickups to be added are small, but when such time-phase differences are great, the addition of waves does not aid in the recognition of the reflected waves, but on the contrary tends to obscure them. Thus, if the time-phase differences between the pickups employed to detect the reflected waves forming a given reflecting horizon are such that the trough of one wave is added into the peak of another wave, the two waves tend to cancel, and the record is obscured.

Under field conditions, it is difficult to correct for a phase-time difference. The character of the underground is generally unknown, so it is impossible to predict accurately in advance just what the time-phase difference will be between seismometers. The use of variable phase changers in the output of the several pickups in the field is generally not practical because it is difficult to predict in advance the proper setting of the several phase changers. Moreover, it is frequently desirable for interpretation purposes to produce an unmixed record, since actual unadjusted phase-time differences may be significant from an exploration standpoint.

In accordance with my invention, a record of wave forms from a plurality of seismometers or pickups is obtained by conventional methods, say as a plurality of traces side by side. The traces are then re-recorded in the laboratory with mixing and with accurate compensation of phase time differences between traces, and employing separate amplification for the several traces that are combined, so that the effect of a selected trace in the resultant may be emphasized as desired.

Thus, a plurality of currents are caused to vary as the original traces, the phase-time compensation therebetween is made (for example with an adjustable scanner), the currents are separately amplified, and then mixed to produce a resultant wave form which is produced for inspection.

During the re-recording operation, if desired, one or more of the currents may be reversed 180° in phase, so that its peaks become valleys and tend to cancel out the peaks of other waves combined in the resultant.

At the beginning of the period during which seismic waves are created and received, the phase-time differences obtaining between spaced seismometers of a reception spread tend to be greater than at later periods, and as the waves attenuate, the required compensation to synchronize the waves becomes less. My invention therefore contemplates adjustment of a scanner during the re-recording operation to assure proper synchronization at any given instant. This adjustment may be made manually or means may be provided to move the several scanner elements automatically at the proper direction and speed.

The addition and compensation processes may be conducted in several ways. One way involves the production of a film in which the several traces are recorded, as some types of sound film are recorded, as a jagged band, the height of the band at any given point corresponding to the amplitude of the wave being picked up. Again, the original wave may be recorded on film as a band of uniform width, the transparency of the band varying lengthwise (i. e. with time) in accordance with the amplitude of the recorded wave. In both of these methods, the light conductivity of the film varies lengthwise, and by inspection, peaks representing the same reflection horizon may be discovered. The film thus produced is then run through a scanner having slits which are adjustable along the length of the film so that the distances between the slits corresponding to the several traces can be adjusted for the time-phase differences. If light is then thrown simultaneously through all the slits, and the film is moved lengthwise, the light passing through each slit varies as the particular trace being scanned. If this light is caused to impinge on an individual photoelectric cell, the output of this cell will vary as the original trace. These outputs are amplified individually, and then combined. The combined outputs, when recorded, will give a wave form which is a true sum of the original traces with compensation for time-phase difference therebetween and with such emphasis of traces as may be introduced in the individual amplifications.

Instead of employing light as a medium for the combination of the traces, sound may be employed. Thus each pickup may be connected with an individual engraving stylus of a phonograph record former through one or more conventional amplifiers, so that the several styli engrave traces side by side on a record. This record may then be played back in another apparatus provided with pickup needles which can be adjusted with respect to position to compensate for the time-phase differences. By separately amplifying and then combining the output of the several phonograph pickups, a record can be produced which is the sum of the original traces with the introduced compensation for time-phase differences and the desired emphasis of selected original traces.

These and other aspects of my invention will be understood more thoroughly in the light of the following detailed description taken in conjunction with the accompanying drawing in which Fig. 1 is a schematic drawing illustrating one form of apparatus for the practice of the invention, employing light as the medium whereby the time-phase difference between several traces is compensated for;

Fig. 2 is a fragmentary schematic diagram illustrating a modification of the apparatus of Fig. 1 for use with a different type of film; and Fig. 3 is a fragmentary schematic diagram illustrating the use of sound as the medium whereby compensation for time-phase differences between several traces is accomplished.

Referring to Fig. 1, it will be observed that a plurality 10, 11, 12, 13 of vibration pickups or seismometers are placed in a line on the surface of the earth extending out from a shot point 14. Seismic waves generated at the shot point are reflected from a formation interface 15 below the surface of the ground, say an interface at which seismic velocities change greatly. Sound waves 10A, 11A, 12A, 13A are reflected from the horizon and picked up by the respective seismometers. Currents varying in accordance with the variations of the received waves are carried from the individual seismometers to a multiple amplifier and recorder 16 of conventional type from which a primary record 17 is formed. This record has a plurality of generally parallel traces 10B, 11B, 12B, 13B corresponding respectively to the seismic waves received at the seismometers. In the modification illustrated in Fig. 1 the traces are translucent or transparent bands having a straight base but a jagged upper margin, the height of the band at any point being the measure of the amplitude of the recorded wave. Thus a peak 10C on the trace 10B corresponds to peaks 11C, 12C and 13C respectively on the other traces. The displacements of the peaks from each other along the film represent phase-time differences between the seismometers.

Either at the time the primary record is formed, or at a later date, for example, in the laboratory, the primary record is passed through an adjustable scanner 18. This scanner is a mask along which the primary record travels lengthwise. The scanner is provided with a number of windows or slits 10D, 11D, 12D, 13D spaced so that the several traces pass respectively past the slits. The slits are adjustable laterally as indicated, so that their position may be adjusted to correspond to matching peaks on the several traces. When this has been accomplished, light from a source 19 is passed through the juxtaposed film and scanner and issues on the other side. The film is moved longitudinally with respect to the scanner and the light passing through each slit varies as the respective trace. The light passing through each slit falls respectively on a separate photoelectric cell 10E, 11E, 12E, 13E. The output of each cell is connected to a separate amplifier 10F, 11F, 12F, 13F. The outputs of the amplifiers are connected to a mixer and recorder 21, which produces a secondary record 22. This secondary record is made on a second photographic film that moves in synchronism with the primary record through the scanner, so that the secondary record represents the sum of the traces on the primary record, compensated for the time-phase differences therebetween.

In previous discussion it was indicated that phase-time differences between original traces may vary as the original recording period progress. Consequently, it may be necessary to adjust the slit positions from time to time during re-recording, either manually or automatically, to assure that there is proper compensation at any instant.

It may be desirable to reverse a given trace in the re-recording process. This can be accomplished by the reversing switches 14A, 14B, 14C, 14D interposed in each case between the individual amplifiers and the mixer.

Any desired schedule of mixing can be employed. Thus all of the amplifier outputs can be mixed together or the outputs of amplifiers 10F and 11F may be mixed to produce one trace while the outputs of amplifiers 12F and 13F are mixed to produce a second trace, as shown by the double traces on the secondary record 22.

Fig. 2 illustrates certain modifications of the apparatus of Fig. 1. As in the former case, currents varying in accordance with received seismic waves are transmitted to an amplifier and recorder which products a film having traces 25A, 26A, 27A, 28A corresponding to the responses of the several pickups. These traces are bands of uniform width, and the variations in wave amplitude are recorded as variations in transparency or translucency of the band. Thus peaks 25B, 26B, 27B, 28B corresponding to each other and representative of a single reflecting horizon (but displaced from each other by phase-time differences due to the geometry of the field pattern of the pickups) are recorded as lighter bands on the traces. As in the previous case, a scanner 18 provided with adjustable slits 25C, 26C, 27C, 28C is employed. The slits are adjusted lengthwise of the film to correspond to the position of the several matching peaks. Light from the source 19 passes through film and slit into a series of light proof boxes 29A, 29B, 29C, 29D, each of which has a photocell 30A, 30B, 30C, 30D. The individual photo cells are in turn connected to the input of individual amplifiers 31A, 31B, 31C, 31D, and the output of the amplifiers goes to a recording camera 32 (containing mixing equipment) through which a film 33 is passed in synchronization with the passage of the primary film 17 through the scanner. Thus a trace 34 is produced on a secondary record or film representative of the sum of the individual traces on the primary record.

If desired, the amplification factors of the several amplifiers between the photo cells and the camera 32 may be adjusted. For example, it may be desirable to add only half the amplitude of three of the traces and the full amplitude of another trace. This is easily accomplished by adjusting the amplification factors so that one or more of the original traces is emphasized.

Referring to Fig. 3 there is a primary amplifier and recorder 40 which receives impulses from four pickups. The output of each pickup is amplified by a separate amplifying unit 40A, 40B, 40C, 40D. The output of each amplifier unit is sent to an engraving stylus 41A, 41B, 41C, 41D, operating simultaneously on a circular phonograph record 42. Thus grooves 43A, 43B, 43C, 43D which vary in accordance with the waves received by the respective pickups, are formed on the record. At the time the primary record 42 is formed, or preferably later in the laboratory, the primary record is played back through a phonograph provided with multiple pickups 44A, 44B, 44C, 44D. These pickups are hinged to a single manifold arm 45 and their pickup needles 46A, 46B, 46C, 46D may be moved along the individual pickups to accomplish the same compensation that is obtained with the apparatus of Figs. 1 and 2. The four phonograph pickups are connected through individual amplifiers 47A, 47B, 47C, 47D and the output of these amplifiers is combined to give a single current. This current is sent to a recording camera 48 which produces a film 49 representative of the secondary record and provided with a single trace 50 which is a combination of the responses of the several seismometers with appropriate compensation for phase-time differences.

By altering the amplification factors of either the primary amplifiers 40A, 40B, 40C, 40D or the secondary amplifiers 47A, 47B, 47C, 47D, any particular trace or traces may be emphasized in the secondary record.

A variety of linkages may be employed to compensate for the phase-time differences between the traces on the original record. Whatever linkage be employed, the result is outstanding, since it permits record mixing as an aid to interpretation in the laboratory under controlled conditions, rather than in the field at the time the primary record is taken and when phase-time differences between seismometer points is known, if at all, only roughly.

The invention offers marked aid in interpretation of seismic records, particularly those obtained in reflection seismic prospecting.

I claim:

1. In apparatus for investigating at least three traces of seismic waves originally recorded side by side with phase-time differences therebetween and originating from a single seismic disturbance but picked up at different points spaced from each other, the combination which comprises individual scanning means on the individual traces adjustable lengthwise along the traces with respect to each other to compensate for phase-time differences between traces, individual pickups operatively associated respectively with the individual scanning means for producing currents that vary as the original traces, individual amplifiers connected respectively to the outputs of the individual pickups, means for combining the outputs of one set of at least two of the amplifiers, means for combining the outputs of a different set of at least two of the amplifiers, means for reversing the phase of the output of one of the amplifiers to be combined, and means for recording the wave forms of the respective combined outputs as traces disposed side by side on a record and means for changing the relative positions of at least one of the scanning means lengthwise of its trace during the recording of the combined outputs to compensate for a change in the phase-time difference between said trace and another of the traces during said interval.

2. In seismic exploration involving the simultaneous recording of at least three traces representing respectively the forms of seismic waves originating in the same seismic disturbance but picked up at points spaced from each other, there being variable phase-time differences between the traces, the improvement which comprises producing electrical currents which vary respectively in accordance with the variations of the original traces, combining one set of at least two of the currents while variably compensating for the variable phase-time difference existing between the traces to which the currents correspond, combining a different set of at least two of the currents while variably compensating for the variable phase-time difference existing between the traces to which these currents correspond, reversing the phase of at least one of the currents prior to combination and recording the wave forms of the respective combined currents.

BURTON D. LEE.

(References on following page)

References Cited in the file of this patent

UNITED STATES PATENTS

| Number | Name | Date |
|---|---|---|
| 1,950,011 | Scheibell | Mar. 6, 1934 |
| 2,144,812 | Rieber | Jan. 24, 1939 |
| 2,155,507 | Reiber | Apr. 25, 1939 |
| 2,215,297 | Owen | Sept. 17, 1940 |
| 2,216,452 | Owen | Oct. 1, 1940 |
| 2,243,729 | Ellis | May 27, 1941 |
| 2,243,730 | Ellis | May 27, 1941 |
| 2,341,303 | Wolfe | Feb. 8, 1944 |
| 2,420,672 | Maillet | May 20, 1947 |
| 2,427,421 | Rieber | Sept. 16, 1947 |
| 2,473,469 | Dahm | June 14, 1949 |

FOREIGN PATENTS

| Number | Country | Date |
|---|---|---|
| 148,257 | Australia | Jan. 11, 1937 |